United States Patent Office 3,298,011
Patented Jan. 10, 1967

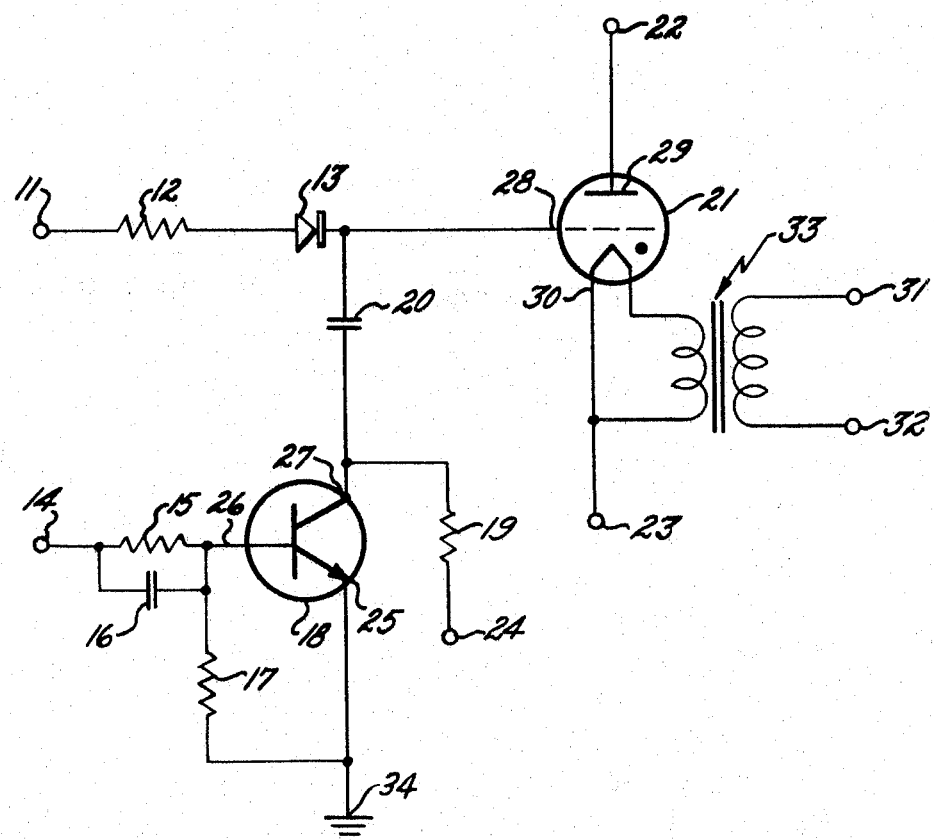
INVENTOR.
STANLEY E. LEHNHARDT
BY
ATTORNEYS

3,298,011
DIGITAL INDICATOR SYSTEM WITH STORAGE
Stanley E. Lehnhardt, Dallas, Tex., assignor to the United States of America as represented by the Secretary of the Air Force
Filed Mar. 31, 1964, Ser. No. 356,341
3 Claims. (Cl. 340—248)

This invention relates to indicator circuits, and more particularly to an indicating circuit for a digital system where the sample state to be indicated is available for only a very short time.

Visual displays of data stored in storage elements of a digital system are often necessary for adequate monitoring of the system. Many schemes are available utilizing neon lamps for this purpose. This invention envisions an indicator system utilizing a transistor and a specialized indicator tube for providing a means for display of the state of a flip-flop or other storage element through selection and storage.

It is, accordingly, one object of this invention to provide a means for display of the state of storage elements in a digital system.

It is another object of this invention to provide an improved transistor circuit for reliably operating a specialized indicator tube.

It is still another object of the present invention to provide a continuous visual monitor of a digital sample which is available for only a short period of time.

The figure of the accompanying drawing shows a schematic circuit diagram of an indicator circuit constructed in accordance with the present invention.

Data terminal 11 is connected through resistor 12 to diode 13 connected in a forward direction to control grid 28 of an indicator tube 21, in this case an Amperex 6977 indicator tube. Plate 29 of indicator tube 21 is connected to terminal 22, which is connected to a source of positive potential of 40 volts. Filament 30 of indicator tube 21 is connected through step-down transformer 33 to terminals 31 and 32 which are connected to a 115 v. A.-C. source. Filament 30 is also connected to terminal 23, to which a positive potential $V_1$ is applied.

Sampling terminal 14 is connected through a parallel combination of a resistor 15 and capacitor 16 to base 26 of an N-P-N transistor 18; bias resistor 17 is also connected between base 26 of transistor 18 and ground terminal 34 to which emitter terminal 25 is also connected. Collector 27 is connected through collector resistor 19 to terminal 24, which is connected to collector voltage $V_3$. Storage capacitor 20 is connected between grid 28 of tube 21 and collector 27 of transistor 18.

A signal voltage from a flip-flop or other storage element of positive polarity is applied at terminal 11, and a positive sampling signal is applied at terminal 14; the sampling signal is coincident in time with the data signal at terminal 11. The signal at terminal 14 causes transistor 18 to switch to a conducting state, thereby providing a low impedance path between collector 27 and emitter 25 to ground terminal 34; the positive signal at terminal 11 therefore charges capacitor 20 through charging resistor 12 and diode 13 connected in the forward direction for a period depending on the pulse width; upon termination of the pulses at terminals 11 and 14, transistor 18 switches to a non-conducting state, thereby disconnecting capacitor 20 from ground; diode 13 becomes in effect an open circuit, and the voltage of capacitor 20, applied to grid 28 of indicator tube 21, causes the lamp to ignite. When capacitor 20 becomes charged by the pulse at terminal 11 as controlled by the pulse at terminal 14, then the necessary voltage is applied to grid 28 to place indicator tube 21 in the conducting state, thereby giving a visual indication of the state of terminal 11. After the pulse at terminal 11 has terminated, indicator tube 21 remains ignited as long as capacitor 20 has the necessary charge.

Capacitor 20 and indicator tube 21 act as a storage system. The indicator tube provides a high impedance load for the charged capacitor so that with a low charging impedance, the capacitor may efficiently act as a memory between samples. The ratio of data pulse time $t$ to storage time should roughly correspond to the ratio of charging resistance 12 to the reverse bias resistance of diode 13. Experiments involving one microsecond data pulses and a 40 sample per second charge rate demonstrated satisfactory visual indication.

For satisfactory operation of the circuit, the peak pulse voltage $V_2$ at terminal 11 should be equal to or less than the collector voltage $V_3$ at terminal 24; also the equation $V_1 = V_2 - V_2 e^{-t/RC} + V_3$ should be satisfied, where $t$ is the time in seconds for the charging of capacitor 20, R is the value of resistor 12 in ohms, C is the value of capacitor 20 in farads, $e$ is the constant 2.718, and $V_1$ is the voltage applied at terminal 23.

This circuit has many advantages over a conventional system of incandescent lamps with transistor drivers, among which are adequate condition storage, low current drain, and low cost for large displays.

It will be understood that the above-described embodiment of the invention is illustrative only and modifications thereof will occur to those skilled in the art.

What is claimed is:
1. Visual signal apparatus comprising:
 (a) an indicator tube having a grid;
 (b) a capacitor connected to the grid of the indicator tube;
 (c) means for charging the capacitor connected to one terminal of the capacitor;
 (d) a source of signal pulses connected to the capacitor charging means;
 (e) switching means connected to the other terminal of the capacitor for enabling the capacitor charging means to charge the capacitor to the peak voltage of the signal pulses;
 (f) and a source of sample pulses connected to the switching means for controlling the switching thereof whereby the capacitor is charged upon occurrence of a sample pulse coincident with a signal pulse igniting the indicator tube for a period greater than the signal pulse period and providing visual indication of the state of the signal pulse source.

2. Visual signal apparatus as described in claim 1 wherein the capacitor charging means comprise a resistor in series with a diode, said resistor connected to said signal pulse source and said diode connected to one terminal of said capacitor in a direction to allow passage of a signal from said signal pulse source.

3. Visual signal apparatus as described in claim 2 wherein the switching means comprise a semiconductor including a base, emitter and collector electrodes, said emitter electrode connected to ground, said collector electrode connected to the remote terminal of said capacitor, and said base being controlled by said sample pulse source to provide a low impedance path to ground between said collector and emitter terminals.

References Cited by the Examiner
UNITED STATES PATENTS
3,119,047   1/1964   Michalski _____ 315—241 X
3,201,703   8/1965   Becker _____ 328—151 X D. K. MYER, *Assistant Examiner.*
NEIL C. READ, *Primary Examiner.*